(12) United States Patent
Lazarus et al.

(10) Patent No.: US 9,708,124 B2
(45) Date of Patent: Jul. 18, 2017

(54) VIBRATORY CONVEYOR AND METHOD FOR CONVEYING SILICON FRAGMENTS

(71) Applicant: Wacker Chemie AG, Munich (DE)

(72) Inventors: Werner Lazarus, Mitterskirchen (DE); Marius Rosumek, Burghausen (DE)

(73) Assignee: WACKER CHEMIE AG, Munich (DE)

( * ) Notice: Subject to any disclaimer, the term of this patent is extended or adjusted under 35 U.S.C. 154(b) by 0 days.

(21) Appl. No.: 14/909,172

(22) PCT Filed: Jul. 23, 2014

(86) PCT No.: PCT/EP2014/065818
§ 371 (c)(1),
(2) Date: Feb. 1, 2016

(87) PCT Pub. No.: WO2015/014688
PCT Pub. Date: Feb. 5, 2015

(65) Prior Publication Data
US 2016/0176641 A1    Jun. 23, 2016

(30) Foreign Application Priority Data

Aug. 1, 2013   (DE) .................. 10 2013 215 096

(51) Int. Cl.
*B65G 27/00* (2006.01)
*B65G 27/04* (2006.01)
*B65G 11/16* (2006.01)

(52) U.S. Cl.
CPC ........... *B65G 11/166* (2013.01); *B65G 27/00* (2013.01); *B65G 27/04* (2013.01)

(58) Field of Classification Search
CPC ....... B65G 11/166; B65G 27/00; B65G 27/04
USPC .......................................... 198/771
See application file for complete search history.

(56) References Cited

U.S. PATENT DOCUMENTS

| | | | |
|---|---|---|---|
| 5,705,250 A | 1/1998 | Hudson, Jr. | |
| 6,375,011 B1 | 4/2002 | Flottmann et al. | |
| 8,021,483 B2* | 9/2011 | Arvidson | C30B 15/02 117/13 |
| 8,136,649 B2* | 3/2012 | Burstrom | B65G 11/166 193/2 R |
| 8,939,277 B2* | 1/2015 | Baumann | B65G 27/24 198/617 |
| 2011/0290616 A1* | 12/2011 | Tenold | B65G 11/166 193/2 R |
| 2013/0189176 A1 | 7/2013 | Wochner et al. | |

FOREIGN PATENT DOCUMENTS

CN           202163902 U    3/2012

* cited by examiner

*Primary Examiner* — Mark A Deuble
(74) *Attorney, Agent, or Firm* — Brooks Kushman P.C.

(57) ABSTRACT

A vibrating conveyor having a conveyor chute which has a conveyor surface consisting of silicon, wherein plastic elements are provided between the base body of the conveyor chute and the conveyor surface. The vibrating conveyor is suitable for use in a method for conveying silicon chunks.

18 Claims, 1 Drawing Sheet

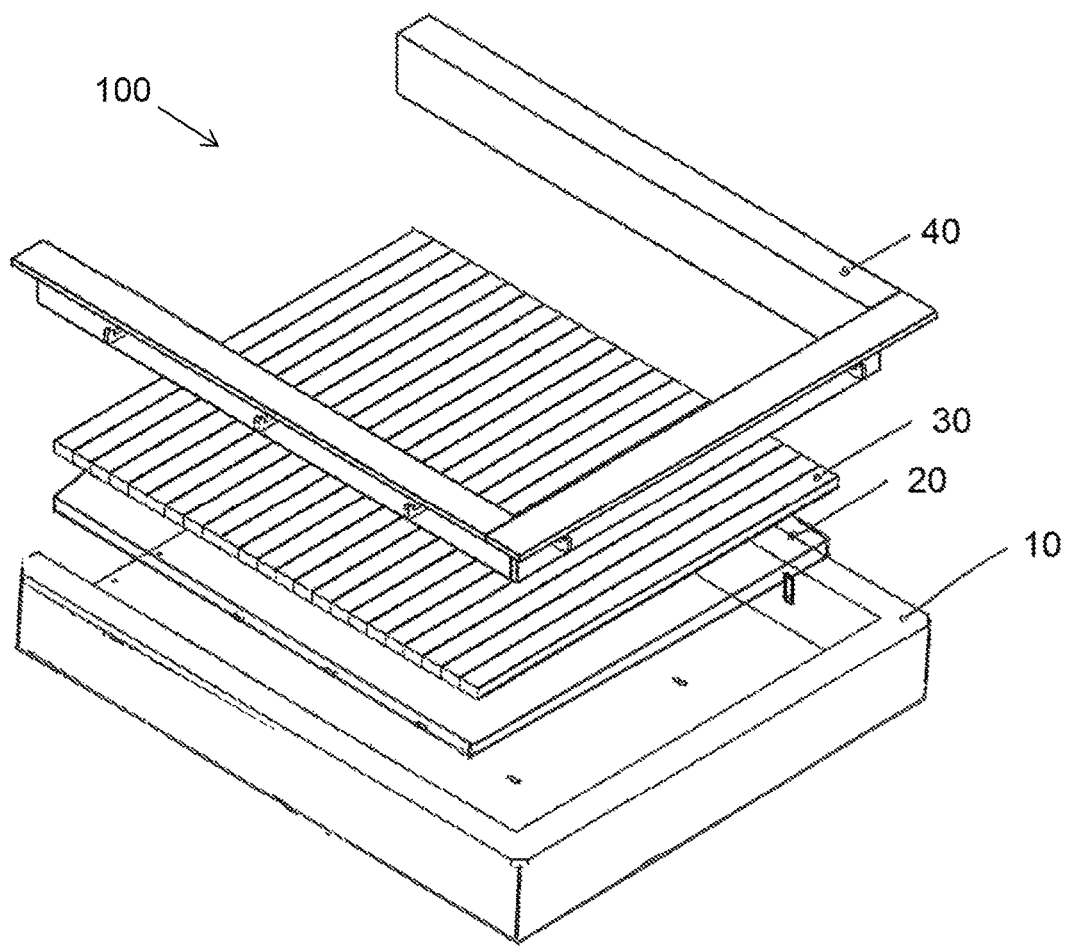

VIBRATORY CONVEYOR AND METHOD FOR CONVEYING SILICON FRAGMENTS

CROSS REFERENCE TO RELATED APPLICATIONS

This application is the U.S. National Phase of PCT Appln. No. PCT/EP2014/065818 filed Jul. 23, 2014, which claims priority to German Application No. 10 2013 215 096.2 filed Aug. 1, 2013, the disclosures of which are incorporated in their entirety by reference herein.

BACKGROUND OF THE INVENTION

1. Field of the Invention

The invention relates to a method for conveying silicon chunks. The invention also relates to a vibrating conveyor.

2. Description of the Related Art

High-purity silicon is produced by chemical vapor deposition of a highly pure chlorosilane gas onto a heated substrate, for example. The silicon is in this case deposited in a polycrystalline fashion in the form of rods. A large part of the monocrystalline silicon required for the semiconductor industry is produced from these silicon rods by means of the Czochralski method.

In this method, a melting crucible is filled with silicon chunks. The fragmented silicon is melted, and a monocrystalline silicon ingot is pulled from the melt by means of a seed crystal.

The silicon chunks required for filling the melting crucible are obtained by comminuting the polycrystalline rods generated during the vapor deposition. For example, metal jaw or roll crushers, hammers or chisels are used as breaking tools.

After the contamination of the brittle silicon rods, undesirable particles and extraneous atoms may be detected on the sharp-edged surfaces of the chunks. The particles are generally dust, which is produced during the comminution of the silicon and during transport of the chunks; the extraneous atoms come in particular from the breaking tools.

These contaminants must be removed before the fragmented silicon is melted in the melting crucible. This is usually done by an etching treatment with acids or acid mixtures, which removes material, and subsequent washing with water.

The large specific surfaces of the sharp-edged chunks have serious disadvantages, and in particular give rise to
high acid consumption for treatments removing material,
high acid spreading through the superficially adhering acid film when transferring the fragmented silicon into a washing bath, with associated contamination of the washing water, and
undercut etching of the chunk edges.

U.S. Pat. No. 6,375,011 B1 has therefore proposed a method for conveying fragmented silicon, in which the silicon chunks are conveyed over a conveyor surface, made of ultrapure silicon, of a vibrating conveyor.

In this case, sharp-edged silicon chunks are rounded when they are conveyed on the vibrating conveyor surface of a vibrating conveyor. The specific surfaces of the silicon chunks are reduced, and superficially adhering contaminants are ground off.

The fragmented silicon rounded by a first vibrating conveyer unit may be conveyed over a second vibrating conveyer unit. Its conveyor surface consists of ultrapure silicon plates arranged parallel, which are fixed by means of lateral fastening devices. The ultrapure silicon plates have passage openings, for example in the form of apertures. The conveyor edges, which serve to laterally delimit the conveyor surfaces, are likewise made of ultrapure silicon plates and, for example, are fixed by holders. The conveyor surfaces made of ultrapure silicon plates are supported by steel plates and optionally damping mats.

It has, however, been found that loosening and even fracture of the silicon cladding of the conveyor surface may occur during the operation of such vibrating conveyor units. Furthermore, there is therefore also a risk of product contamination during the conveying.

This gave rise to the object of the invention.

SUMMARY OF THE INVENTION

Loosening and/or fracture of a silicon conveying surface and reduced product contamination in the conveying of fragmented silicon achieved by a vibrating conveyor having a conveyor chute, which comprises a conveyor surface consisting of silicon, wherein plastic elements are provided between the base body of the conveyor chute and the conveyor surface.

These and other objects are also achieved by a method for conveying silicon chunks, wherein the silicon chunks are conveyed over a conveyor surface of a vibrating conveyor as described.

DETAILED DESCRIPTION OF THE PREFERRED EMBODIMENTS

The conveyor surface is moved by rapid vibrations, preferably with a small amplitude, in particular forward/upward and backward/downward.

The silicon chunks lying on the conveyor surface are thereby set in a fluid forward movement, which ranges from a sliding movement to a throwing movement.

All sides of a silicon chunk in this case alternately face toward the silicon conveyor surface.

As a result of the sliding and throwing movement of the silicon chunks on the silicon surface, the edges are broken and superficially adhering contaminants are ground off, so that uniform rounding of the chunks is to be observed.

The dust formed is preferably separated from the silicon chunk flow, for example by a suction device, preferably along the conveyor path, and most preferably at the exit.

By using an electromagnet or a permanent magnet, which is for example fitted at the exit, magnetic particles are preferably separated from the silicon chunk flow.

An example conveyor chute 100 is depicted in FIG. 1. The conveyor surface consisting of silicon, preferably configured as cladding consisting of ultrapure silicon 30, is protected by the plastic elements 20 against direct contact with the base material 10 of the conveyor chutes 100 during the conveying.

The conveyor surface is preferably formed in a planar fashion, or in the shape of a trough or tube.

In the context of the present invention, ultrapure silicon is intended to mean monocrystalline or polycrystalline silicon with a degree of purity preferably >99.99%.

Preferably, the conveyor surface consisting of silicon has the same degree of purity as the silicon chunks to be conveyed.

BRIEF DESCRIPTION OF DRAWINGS

FIG. 1 depicts an example conveyor chute according to one or more embodiments. The FIGURES are not to scale. The size and shape of various depicted features is for illustration purposes only.

The plastic elements preferably consist of polyurethane (PU), polypropylene (PP), polyethylene (PE), polyvinylidene fluoride (PVDF), or polyamide (PA).

The plastic elements are preferably cladding of the conveyor chute with plastic. The cladding parts consisting of plastic are preferably secured in the conveyor chute. The silicon elements forming the conveyor surface are preferably likewise placed in the conveyor chute clad with plastic and secured.

The plastic elements are preferably support plates, on which there is silicon that forms the conveyor surface. Preferably, the plastic plate and the silicon cladding part are adhesively bonded to one another. The support plates with silicon claddings are preferably secured in the conveyor chute.

With the present invention, it is possible to transport highly pure fragmented polysilicon with low contamination in conveyor chutes.

In order to obtain an optimal conveying behavior of the silicon chunks, the cladding parts should be clamped sufficiently in the conveyor chute.

Loose or loosening parts are detrimental influences which negatively affect the conveying behavior of the chutes.

In this way, above all, the vibration ranges of the chutes are altered and affect the conveying speed, and therefore the cycle rate of subsequent processes.

In order to counteract this, the cladding parts consisting of silicon are preferably fastened in an assembly on common support plates.

The number of bolts per support plate is 1–n bolts (preferably 1-50), depending on the type of conveyor chute.

For the support plate material, a low-contamination material is to be selected, preferably PU with a Shore hardness 80-98 A without additives or colorants.

The support material in this case has a defined thickness of 2-30 mm, more preferably 3-5 mm.

The fastening of the silicon parts on the support material is preferably carried out with low-contamination resilient adhesives with high intrinsic adhesion, for example silicone adhesives.

Fastening of the silicon claddings on PU support material instead of steel support material is characterized by lower contamination of the conveyed product with iron.

The manufactured cladding parts (1–n) on support material are placed in the conveyor chute and changed according to the degree of wear.

The clamping of the inlaid claddings (plastic cladding, silicon cladding, support plates) is preferably carried out by means of one or more of the clamping mechanisms mentioned below:

- low-contamination screw connections extending around on the conveyor chutes, which press directly on the cladding
- low-contamination clamping wedges in the conveyor chute, securing of the cladding in the conveying direction
- fixed clamping of the cladding by means of the lateral parts of the conveyor chute
- screwing of the Si cladding via the support plate to the chute bottom Clamping of the cladding 30 may be carried out by means of additional lateral parts 40 of the conveyor chutes 100, which are preferably fastened on the chutes 100 by means of a rapid clamping system.

The additional clamping from above prevents lifting or loosening of the cladding during the vibrating conveying.

The material to be used for the lateral parts is preferably PP and PE, adhesively bonded to PU mats, PU with a Shore hardness 60-80 A, or a comparable low-contamination and wear-resistant material, such as silicone.

All polymers, types of PU and silicones are preferably free of colorants or additives, for example crushed rock, carbon black, etc.

In order to protect the cladding against wear in the conveyor chutes, and in order to save on costs, separating mats made of various materials, which prevent direct contact of the silicon chunks with the cladding, are preferably fastened on the conveyor chutes.

The separating mat material is preferably PU with a Shore hardness 60-80 A.

The invention also relates to another type of conveyor chute cladding. This may, for example, be done by means of special plastics.

Preferably, low-contamination and highly wear-resistant plastics such as PU with a Shore hardness 60-98 A are used in this case.

The nature of the fastening is in this case carried out in the same way as for the silicon cladding.

Bearing parts with direct contact or parts in the immediate vicinity of the product are encapsulated with special injection-molded PU parts, or entire surfaces of frameworks are clad with PU spray coating.

Qualified materials are PU coating systems with Shore hardness 65-98 A without addition of additives.

LIST OF REFERENCE NUMBERS AND DESIGNATIONS

10 base body of the conveyor
20 plastic elements
30 cladding part consisting of silicon
40 lateral part
100 conveyor chute

The invention claimed is:

1. A vibrating conveyor having a conveyor chute, the conveyor chute comprising a conveyor surface consisting of silicon, wherein plastic elements consisting of PU, PP, PE, PVDF or PA are provided between a base body of the conveyor chute and the conveyor surface, wherein the plastic elements and the silicon that forms the conveyor surface are adhesively bonded to support plates, which are laid in the conveyor chute and secured, wherein the conveyor surface consisting of silicon is partially covered with sheets of PU.

2. The vibrating conveyor of claim 1, wherein the support plates are screwed circumferentially onto the conveyor chute or to a conveyor chute bottom.

3. The vibrating conveyor of claim 1, wherein the support plates are clamped in the conveyor chute by means of clamps.

4. The vibrating conveyor of claim 1, wherein the support plates are clamped in the conveyor chute by means of clamping wedges.

5. The vibrating conveyor of claim 1, further comprising lateral parts consisting of plastic, which are fastened on the conveyor chute and which clamp the support plates.

6. A method for conveying silicon chunks, wherein the silicon chunks are conveyed over the conveyor surface of the vibrating conveyor of claim 1.

7. A vibrating conveyor having a conveyor chute, which comprises a conveyor surface consisting of silicon, wherein plastic elements consisting of PU, PP, PE, PVDF or PA are provided between a base body of the conveyor chute and the conveyor surface, wherein the plastic elements are a cladding of the conveyor chute with plastic, and wherein the conveyor surface is formed by further cladding parts consisting of silicon, wherein the plastic cladding elements are secured in the conveyor chute, wherein the plastic cladding parts consisting of silicon are laid in the conveyor chute cladded with plastic, and secured, wherein the conveyor surface consisting of silicon is partially covered with sheets of PU.

8. The vibrating conveyor of claim 7, wherein the cladding parts are screwed circumferentially onto the conveyor chute or to a conveyor chute bottom.

9. The vibrating conveyor of claim 7, wherein the cladding parts are clamped in the conveyor chute by means of clamps.

10. The vibrating conveyor of claim 7, wherein the cladding parts are clamped in the conveyor chute by means of clamping wedges.

11. The vibrating conveyor of claim 7, furthermore comprising lateral parts of plastic, which are fastened on the conveyor chute and which clamp the cladding parts.

12. A method for conveying silicon chunks, wherein the silicon chunks are conveyed over the conveyor surface of the vibrating conveyor of claim 7.

13. A vibrating conveyor having a conveyor chute, the conveyor chute comprising:

a conveyor surface consisting of silicon cladding parts;
a plastic support plate consisting of PU, PP, PE, PVDF or PA disposed directly beneath the silicon cladding parts; and
a base body separated from the conveyor surface by the plastic support plate,
wherein the plastic support plate and the silicon cladding parts are secured in the conveyor chute, and wherein the conveyor surface consisting of silicon cladding parts is partially covered with sheets of PU.

14. The vibrating conveyor of claim 13, wherein the support plate is screwed circumferentially onto the conveyor chute or to a conveyor chute bottom.

15. The vibrating conveyor of claim 13, wherein the support plate is clamped in the conveyor chute by means of clamps.

16. The vibrating conveyor of claim 13, wherein the support plate is clamped in the conveyor chute by clamping wedges.

17. The vibrating conveyor of claim 13, further comprising a lateral part consisting of plastic, fastened on the conveyor chute, and clamping the support plate.

18. A method for conveying silicon chunks, wherein the silicon chunks are conveyed over the conveyor surface of the vibrating conveyor of claim 13.

* * * * *